Nov. 21, 1950     E. L. BUSH     2,530,449

CRAB TRAP

Filed Oct. 18, 1948

INVENTOR.
EAN LEE BUSH

BY *George B. White*

ATTORNEY

Patented Nov. 21, 1950

2,530,449

UNITED STATES PATENT OFFICE 2,530,449

CRAB TRAP

Ean Lee Bush, San Francisco, Calif.

Application October 18, 1948, Serial No. 55,063

4 Claims. (Cl. 43—102)

This invention relates to a trap for catching crabs and the like crustacea.

The primary object of the invention is to provide a crab trap which is adapted to have several comparatively large openings for the entrance and trapping of the crab or the like, and which greatly facilitates the removal and handling of the trapped crabs.

The novel features of my crab trap include; a sectional compartment, the top section of which can be easily lifted off the bottom section, trap openings formed by complemental edges along the contiguous sides of said trap sections, a plurality of separately swingable trap gates at each trap opening, a top trap opening and gate, a guard platform formed at each opening against which the trap gate sections abut to prevent their outward swinging and which guard openings also prevent the crawling of the crabs out of the lower trap section.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein Fig. 1 is a perspective view of my crab trap.

Fig. 2 is a cross sectional view of my crab trap the section being taken on the lines 2—2 of Fig. 1, and Fig. 3 is a fragmental perspective view of one of the inlets and the gate on my crab trap.

In carrying out my invention I make use of a lower trap section or base 1 upon which rests an upper or top section 2 to form a trap box or compartment. Each section is preferably made of a comparatively heavy wire frame 3 forming the edges and outlines of the respective sections, and comparatively light wires 4 secured on the frame 3 in intersecting arrangement so as to form a comparatively large mesh and permit the water to flow freely through the box.

The meeting edges of the frames 3 of the base section 1 and top section 2 complement one another to form trap inlets or openings 6, preferably one on each side. The top edge 7 of the base section 1, in the illustrative form herein, is straight or horizontal all around. The complemental lower edge 8 of the top section 2 is bent upwardly at each side to form the upper portion of a substantially rectangular frame 9 for the inlet opening 6.

A guard platform 12 is extended inwardly of the box from the top edge 7 at each inlet opening six. Each guard 12 is formed of a plurality of adjacent wire loops 11, each loop having a side at right angles to the top edge 7, and a return side 13 at an acute angle to the corner of the bottom below. Each loop 11 is fixed to the top edge 7 so that the entire guard platform 12 is in a plane generally parallel with the bottom 14 of the base section 1 and spaced above the bottom, with the brace structure 13 extending at an incline to the bottom corner, to prevent the crabs from crawling up to the opening 6. A bar 16 connects the tips 17 of the loops 11.

The swinging gate 18 to cover each opening 6 is swinging from the top rail 19 of the inlet frame 9, and is made of individually swingable sections, so as to permit a long inlet opening, yet reduce the resistance to the passage of the crabs to a minimum. A plurality of spaced wire fingers 21 are looped and pivoted on said top rail 19 and extend downwardly and inwardly of the box so that their free ends rest on the guard bar 16. Cross wires or bars 22 connect together a selected group of adjacent fingers 21. For instance in this illustration twelve fingers 21 are provided at each inlet opening 6, divided in three groups of four fingers 21 in each section.

The top section 2 has an inlet opening 23 formed by a wire frame 24 on the top 26 thereof. From one longitudinal edge 27 of the frame 24 extends a guard platform 28 constructed similarly to the guards 12 heretofore described, except that the return portions of the fingers engage one of the top wires 4' of the frame 3 of the top section 2 spaced from the edge of the opening 23. From the other longitudinal edge 29 of the frame 24 extends downwardly and inwardly a sectional swinging gate 31 constructed similarly to the gates 18 heretofore described. The free end of the gate 31 rests against the inner edge of the guard platform 28 at the guard bar 16' so as to be pushed away by the descending crab.

In order to facilitate the lowering and raising of the trap, in an upright position, the base section 1 has heavy weights attached thereto.

In this illustration a heavy step 32 is provided under each of opposite inlets 6, in the form of a concrete block cast or secured to the adjacent bottom edges of the base section 1. Such steps 32 also facilitate the crawling of crabs up to the respective inlets 6. The top and base sections may be detachably secured together by suitable wire ties 33. The box can be raised or lowered by suitable lines 34 and connected by ties 36 to the base section 1 in any suitable manner. In order to remove trapped crabs, the wire ties 33 are loosened or released and the top section 2 is lifted off the base section 1, allowing easy access to the crabs in the base section 1.

I claim:

1. A trap of the character described comprising a lower section having a bottom and sides formed from spaced wires, an upper section removably fitting over the lower section and having a top and sides formed from spaced wires and complementing said lower section into a trap box, complemental frame members at the meeting edges of said sections defining inlet openings for the animals to be trapped, a generally horizontal platform fixed in said lower section and extended inwardly from the edge of each opening at the lower section, a swingable gate extended downwardly from the top edge of each opening in said upper section and into abutting relation with the inner edges of the respective platforms and weights on opposite sides of said lower section in the form of steps below the respective inlet openings.

2. A trap of the character described comprising a lower section having a bottom and sides formed from spaced wire, an upper section removably fitting over the lower section and having a top and sides formed from spaced wires and complementing said lower section into a trap box, complemental frame members at the meeting edges of said sections defining inlet openings for the animals to be trapped, a generally horizontal platform fixed in said lower section and extended inwardly from the edge of each opening at the lower section, a swingable gate extended downwardly from the top edge of each opening in said upper section and into abutting relation with the inner edges of the respective platforms, a rigid skeleton frame forming the contour of each section, said spaced wires being secured on the respective skeleton frames, each of said platforms including a plurality of spaced platform elements extended inwardly of the lower edge of each opening, and a brace element inclined from each platform element outwardly and under said platform elements and being secured at a point spaced from said lower edge of the adjacent opening.

3. A trap of the character described comprising a lower section having a bottom and sides formed from spaced wires, an upper section removably fitting over the lower section and having a top and sides formed from spaced wires and complementing said lower section into a trap box, complemental frame members at the meeting edges of said section defining inlet openings for the animals to be trapped, a generally horizontal platform fixed in said lower section and extended inwardly from the edge of each opening at the lower section, a swingable gate extended downwardly from the top edge of each opening in said upper section and into abutting relation with the inner edges of the respective platforms, a plurality of spaced platform elements extended inwardly of the lower edge of each opening, and a brace element extended from each platform element outwardly to the adjacent corner of said lower section below the adjacent opening.

4. A trap of a character described comprising a lower section having a bottom and sides formed from spaced wires, an upper section removably fitting over the lower section and having a top and sides formed from spaced wires and complementing said lower section into a trap box, complemental frame members at the meeting edges of said section defining inlet openings for the animals to be trapped, a generally horizontal platform fixed in said lower section and extended inwardly from the edge of each opening at the lower section, a swingable gate extended downwardly from the top edge of each opening in said upper section and into abutting relation with the inner edges of the respective platforms, a plurality of spaced platform elements extended inwardly of the lower edge of each opening, a brace element extended from each platform element outwardly to adjacent corner of said lower section below the adjacent opening, and an abutment member extended across the inner ends of said platform elements.

EAN LEE BUSH.

REFERENCES CITED

The following references are of record in the file of this patent:

UNITED STATES PATENTS

| Number | Name | Date |
| --- | --- | --- |
| Re. 8,975 | Koons | Nov. 18, 1879 |
| 379,701 | Jenkins | Mar. 20, 1888 |
| 753,305 | Perry | Mar. 1, 1904 |
| 1,262,160 | Barker | Apr. 9, 1918 |
| 1,335,359 | Beisel | Mar. 30, 1920 |
| 1,601,203 | Erdmann | Sept. 28, 1926 |
| 2,470,177 | MacDonald | May 17, 1949 |